United States Patent [19]

White

[11] 4,345,328
[45] Aug. 17, 1982

[54] ECC CHECK BIT GENERATION USING THROUGH CHECKING PARITY BITS

[75] Inventor: Gary D. White, Chanhassen, Minn.

[73] Assignee: Sperry Corporation, New York, N.Y.

[21] Appl. No.: 164,211

[22] Filed: Jun. 30, 1980

[51] Int. Cl.$^3$ .............................................. G06F 11/10
[52] U.S. Cl. ...................................................... 371/38
[58] Field of Search .......................................... 371/38

[56] References Cited

U.S. PATENT DOCUMENTS

| | | | |
|---|---|---|---|
| 3,755,779 | 8/1973 | Price | 371/38 |
| 4,077,028 | 2/1978 | Lui et al. | 371/38 |
| 4,077,565 | 3/1978 | Nibby, Jr. et al. | 371/38 |

*Primary Examiner*—David H. Malzahn
*Attorney, Agent, or Firm*—William Craig Fuess; Kenneth T. Grace; Thomas J. Scott

[57] ABSTRACT

Apparatus for and method of providing single bit error correction and double bit error detection using through checking parity bits. A coding scheme is implemented which uses through checking parity bits appended to each byte as check bits. The remaining check bits are generated such that the combination of through checking parity bits and remaining check bits together provide single bit error correction and double bit error detection.

6 Claims, 10 Drawing Figures

| DECODER | INPUT A | INPUT B | INPUT C | ENABLE $\overline{A}$ | ENABLE $\overline{B}$ | OUTPUTS | | | | | | | |
|---|---|---|---|---|---|---|---|---|---|---|---|---|---|
| | | | | | | 0 | 1 | 2 | 3 | 4 | 5 | 6 | 7 |
| 450 | 434 | 433 | 432 | 431 | 435 | — | 01 | 02 | — | 03 | — | — | 00 |
| 451 | 434 | 433 | 432 | 430 | 431 | P0 (439) | 05 | 06 | — | 07 | — | — | 04 |
| 452 | 434 | 433 | 432 | 431 | 436 | — | 10 | 11 | — | 12 | — | — | 09 |
| 453 | 434 | 433 | 432 | 436 | 430 | P1 (440) | 14 | 15 | — | 16 | — | — | 13 |
| 454 | 430 | 431 | 432 | 433 | 437 | — | 19 | 20 | — | 21 | — | — | 18 |
| 455 | 430 | 431 | 432 | 433 | 434 | P2 (441) | 23 | 24 | — | 25 | — | — | 22 |
| 456 | 430 | 431 | 432 | 438 | 438 | — | 28 | 29 | — | 30 | — | — | 27 |
| 457 | 430 | 431 | 432 | 433 | 434 | P3 (442) | 32 | 33 | — | 34 | — | — | 31 |
| 458 | 430 | 435 | 436 | 430 | 434 | — | — | — | — | — | 17 | 08 | — |
| 459 | 433 | 437 | 438 | 430 | 431 | — | — | — | — | — | 35 | 26 | — |

*Fig. 10*

ECC CHECK BIT GENERATION USING THROUGH CHECKING PARITY BITS

BACKGROUND OF THE INVENTION

The present invention generally relates to error correction techniques for semiconductor memories and more specifically relates to providing single bit error correction/double bit error detection (SEC/DED) using a coding scheme which utilizes through checking parity bits.

R. W. Hamming published an article entitled "Error Detecting and Error Correcting Codes" in the Bell System Technical Journal (i.e., volume 29 pp 147–160, April 1950) in 1950 which proposed a method of coding data which permits correction of single bit errors and detection of double bit errors (i.e., SEC/DED). This technique has become very popular for use in semiconductor memories in recent years, since it permits the utilization of large scale integrated circuit (LSI) semiconductor memories which may contain known intermittant or solid errors. The technique proposed by Hamming necessitates the use of redundant coding bits to effect the error detection and correction. The work by Hamming and many subsequent efforts by others were directed toward establishing coding schemes which require a minimum number of redundant coding bits to provide a given level of error detection and correction.

A second important evolution in computer error detection is the use of through checking. In its simplest form, through checking appends one or more redundant parity bits to each data quantity for internal transfers occurring within the computer. By using such through checking, errors may be detected and isolated during normal register-to-register transfers. Whereas implementing through checking would appear to be a simple hardware decision (i.e., should the hardware be added for generation, transfer and checking of redundant parity bits), the implications may be quite significant in machines having highly microprogrammed architecture. Recovery from intrasequence intermittant errors is possible because of early error detection capabilities, for example.

It is now common for medium and large scale computers to employ both SEC/DED for memories and through checking for internal data paths. These two techniques are historically viewed and implemented independently.

SUMMARY OF THE INVENTION

The present invention matches the two techniques of SEC/DED and through checking when used together in a computer. Rather than choose an optimal SEC/DED coding scheme for the combined data and through checking parity bits, a suboptimal SEC/DED coding scheme is chosen which makes use of the through checking parity bits. In the latter case, a larger total number of SEC/DED coding bits is required. However, because the through checking parity bits are also SEC/DED coding bits, the total number of additional SEC/DED coding bits required is less than in the prior technique.

It is, of course, possible to use the through checking parity bits as SEC/DED coding bits because the through checking parity bits are not independent bit positions but represent parity of defined data bit positions.

DETAILED DESCRIPTION OF THE PREFERRED EMBODIMENT

The preferred embodiment of the present invention is described as implemented in the 1100 Series computers of the assignee of this invention. As such, the preferred embodiment uses a 36 bit word containing four nine-bit bytes. Those skilled in the art will be readily able to apply the present invention to other machines having different architectures.

Figure 1:
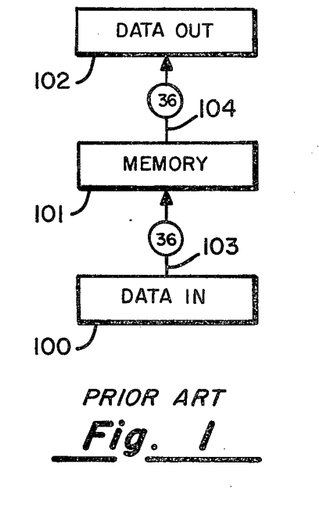
FIG. 1 shows the prior art path of data into and out of a word oriented memory.

To teach the present invention, the evolution of SEC/DED and through checking are briefly discussed. FIG. 1 shows a prior art structure having 36 bit MEMORY 101, which is loaded from a 36 bit register, DATA IN 100 via the 36 bit cable 103. The 36 bit output of MEMORY 101 is transferred to the 36 bit register, DATA OUT 102, via the 36 bit cable 104. Thus it can be seen that FIG. 1 shows a prior art struction having no error detection and correction capability. This structure was utilized early in the history of the computer as dictated by economic factors. This structure proved satisfactory when MEMORY 101 had a relatively small capacity (i.e., few addressable locations) and had a reliability factor consistent with that of the other hardware elements (not shown) of the computer.

Figure 2:
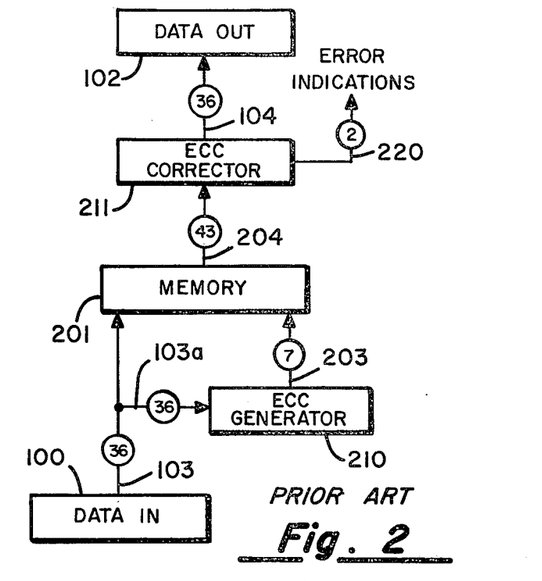
FIG. 2 shows the prior art addition of circuitry to provide SEC/DED to a word oriented memory.

FIG. 2 shows the prior art memory circuits with the addition of normal SEC/DED capability. DATA IN 100 supplies the 36 bit word to MEMORY 201 via 36 bit cable 103 as above. However, element ECC GENERATOR 210 receives the same 36 bit word via cable 103a. ECC GENERATOR 210 generates seven redundant check bits in the manner described by Hamming and supplies them to MEMORY 210 via seven bit cable 203. Notice that MEMORY 201 must store 43 bits (i.e., 36 data bits received via cable 103 and seven redundant check bits received via cable 203) at each addressable location.

ECC CORRECTOR 211 receives the 43 bit output from MEMORY 201. ECC CORRECTOR 211 uses the Hamming technique to correct single bit errors and detect double bit errors in the 36 bit data word which is supplied to DATA OUT 102 via 36 bit cable 104. ECC CORRECTOR 211 also generates the two bit ERROR INDICATIONS signal transferred via cable 220 which notifies other circuitry (not shown) of whether an error is detected and whether an error if detected is a single bit (i.e., correctable) error.

Figures 3, 4:
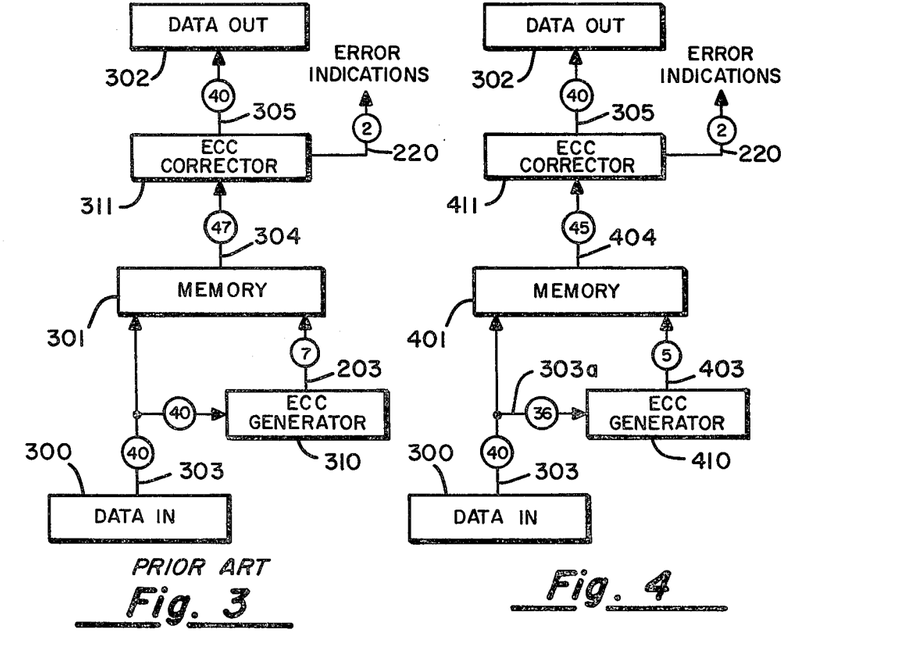
FIG. 3 shows the prior art addition of through checking parity to a word oriented memory having SEC/DED.
FIG. 4 shows the transfer of data to and from a word oriented memory using the present invention to provide SEC/DED and through checking.

FIG. 3 shows the prior art memory structure employing both SEC/DED and through checking. In the preferred embodiment, the 36 bit data word is considered to consist of four, nine-bit bytes. A parity bit (odd parity) is assigned to each of the four, nine bit bytes producing a 40 bit word supplied by DATA IN 300 to MEMORY 301. ECC GENERATOR 310 generates seven check bits for the 40 bit word. A review of the teachings of Hamming show that seven redundant coding bits supply SEC/DED for a 40 bit data word, as well as a 36 bit word (see also FIG. 2). The seven redundant coding bits are supplied to MEMORY 301 via cable 203. MEMORY 301 must store 47 bits (i.e., 36 data bits, plug 4 through checking parity bits, plus 7 redundant check bits) at each addressable location.

ECC CORRECTOR 311 receives the 47 bit output of MEMORY 301 via cable 304. SEC/DED is performed in the manner taught by Hamming on the 40 bit word (i.e., 36 data bits and 4 through checking parity bits) which is transferred to DATA OUT 302 via 40 bit cable 305. ECC CORRECTOR 311 also transfers the two bit ERROR INDICATIONS via line 220 as above.

FIG. 4 shows an equivalent structure providing SEC/DED and through checking according to the present invention. DATA IN 300 supplies the 40 bit word (i.e., 36 data bits plus 4 through checking parity bits) to MEMORY 401 via cable 303 as before. ECC GENERATOR 410 receives only the 36 data bits via cable 303a (see also FIG. 3). ECC GENERATOR 410 generates a suboptimal nine bit SEC/DED code according to the present invention. The nine bit SEC/DED code is suboptimal since Hamming teaches that only seven coding bits are required for SEC/DED. However, since four of the nine coding bits are parity bits on each of the four, nine bit bytes, the four through checking bits are used as transferred to MEMORY 401 from DATA IN 300 via cable 303. ECC GENERATOR 410 generates the remaining five coding bits and transfers them to MEMORY 401 via cable 403. Notice that MEMORY 401 need store only 45 bits for each addressable location.

ECC CORRECTOR 411 receives the 45 bit output of MEMORY 401 via cable 404. The 40 bits transferred to DATA OUT 302 contain the 36 data bits and the four through checking parity bits. ECC CORRECTOR 411 transfers the two bit ERROR INDICATIONS via cable 220 as before.

Figure 5:
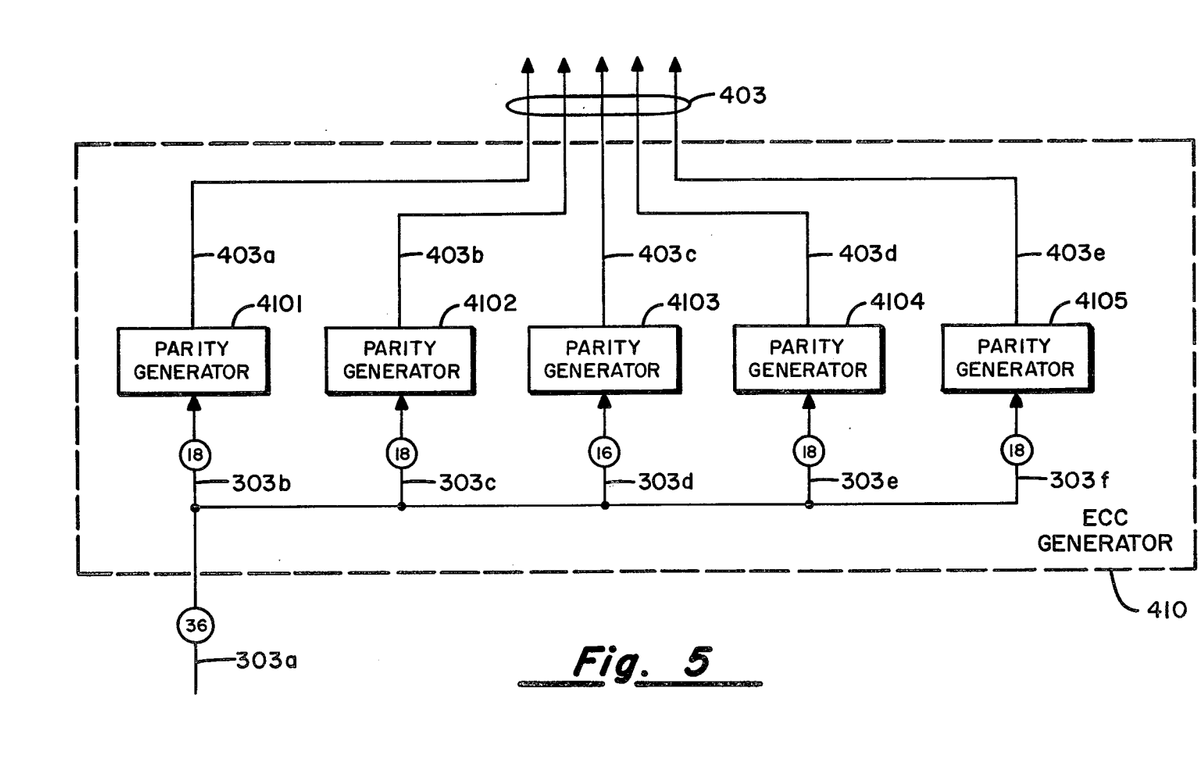
FIG. 5 shows the detailed construction of ECC GENERATOR 410.

FIG. 5 shows the detailed construction of ECC GENERATOR 410. PARITY GENERATOR 4101, 4102, 4103, 4104, and 4105 are simple parity trees constructed of monolithic devices which generate an odd parity output (i.e., binary one if sum of binary ones of input is even and binary zero if sum of binary ones of input is odd). Each of PARITY GENERATOR 4101, 4102, 4103, 4104 and 4105 has a single output bit.

Figure 6:
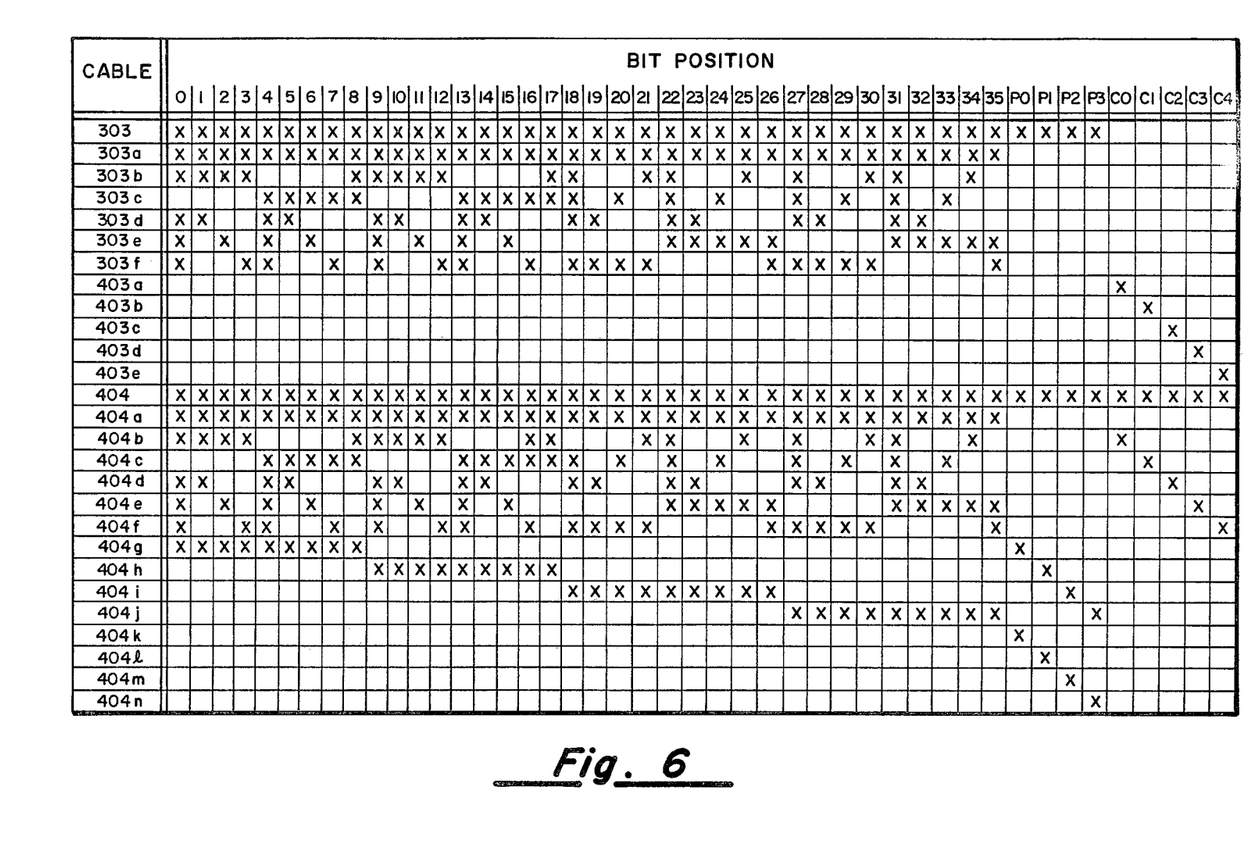
FIG. 6 shows the signals represented in various cables.

FIG. 6 shows in tabular form, the inputs (i.e., cables 303a,b,c,d,e, and f) and outputs (i.e., cables 403a,b,c,d, and e) of PARITY GENERATOR 4101, 4102, 4103, 4104 and 4105. See also FIG. 5. The five output bits of ECC GENERATOR 410 are the five coding bits termed C0, C1, C2, C3, and C4. Cable 404 is shown in FIG. 4 and FIG. 6 as supplying the 45 bit output of MEMORY 401. As is seen in FIG. 6, cable 404 transfers the 36 data bits (i.e., numbered 00–35) the four through checking parity bits (i.e., P$\phi$, P1, P2, and P3), and the five coding bits (i.e., C0,C1,C2,C3 and C4).

Figure 7:
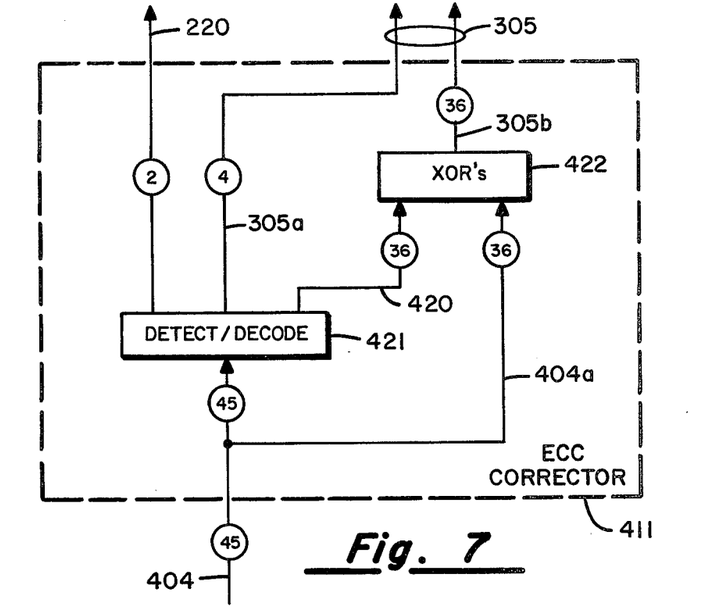
FIG. 7 shows the overall construction and operation of ECC CORRECTOR 411.

FIG. 7 shows the composition of ECC CORRECTOR 411. The 45 bit output of MEMORY 401 is receives via cable 404. The 36 data bits are transferred to XOR's 422 via line 404a for correction. DETECT/DECODE 421 received all 45 bits from MEMORY 401. The two bit ERROR INDICATIONS is generated and transferred via cable 220. The four through checking parity bits are regenerated by DETECT/DECODE 421 and transferred via cable 305a. Cable 420 transfers the one of 36 possible correction signals for single bit error correction from DETECT/DECODE 421 to XOR's 422. The 36 data bits as corrected by XOR's 422 are transferred from XOR's 422 via cable 305b.

Figure 8:
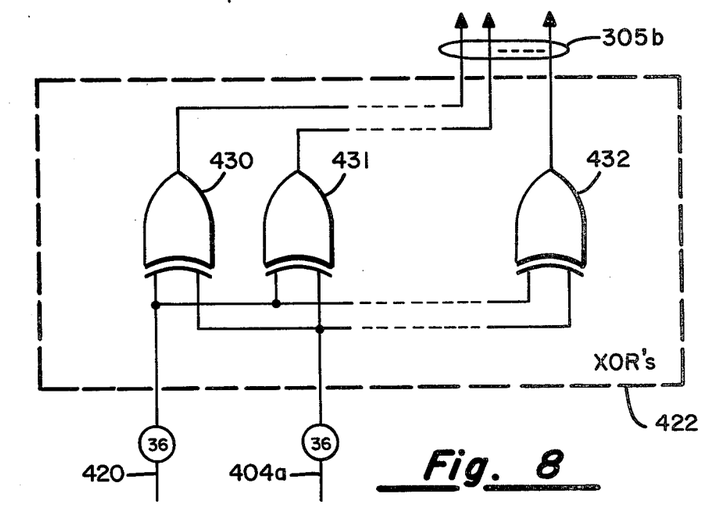
FIG. 8 shows the detailed construction and operation of XOR's 422.

FIG. 8 shows the detailed construction of XOR's 422 which contains exclusive-OR gates 430, 431, . . . 432. One such exclusive-OR gate is required for each of the 36 data bits. One input to each of the exclusive-OR gates is a corresponding one of the 36 data bits as received from MEMORY 410 via cable 404a. The second input to each exclusive-OR gate is a correction signal from a corresponding one of the conductors of 36 bit cable 420. The generation of the correction signals is described below. Only one of the 36 correction signals is received to validly provide single bit error correction. The one correction signal will logically invert (i.e., change from binary one to binary zero or from binary zero to binary one) the one of the 36 data bit positions found to be in error. The remaining bit positions will be transferred via cable 305b in the same state as received from MEMORY 401 via cable 404a.

Figure 9:
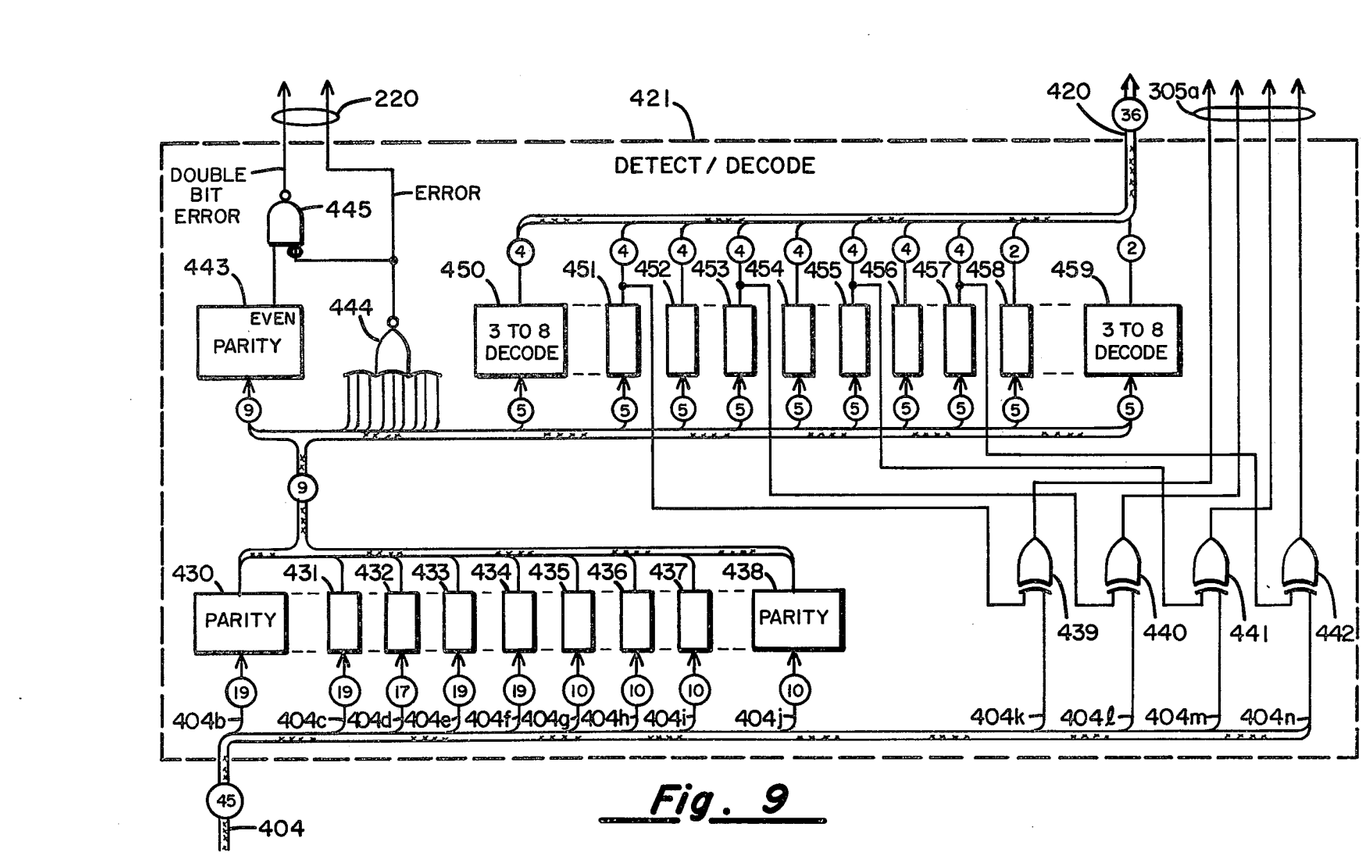
FIG. 9 shows the detailed construction and operation of DETECT/DECODE 421.

FIG. 9 shows the detailed construction and operation of DETECT/DECODE 421. The 45 bit output of MEMORY 401 is transferred to DETECT/DECODE 421. Exclusive-OR gates 439, 440, 441, and 442 receive the four through checking parity bits, P$\phi$, P1, P2, and P3, via lines 404k, 404l, 404m, and 404n, respectively. See also FIG. 6. PARITY 430, 431, 432, 433, 434, 435, 436, 437, and 438 are simple parity trees each receiving multiple input bits and each providing a single even-parity output bit. See FIG. 6 for the inputs via cables 404b, 404c, 404d, 404e, 404f, 404g, 404h, 404i, and 404j.

The outputs of PARITY 430, 431, 432, 433, 434, 435, 436, 437, and 438 are a nine bit error syndrome. If no error has occurred, all nine syndrome bits will be low (i.e., each of PARITY 430–438 has an even parity input). Such a no error condition (i.e., all nine syndrome bits low) causes gate 444 and PARITY 443 (i.e., even parity) to output highs. Gate 444 signals that no error is present. If any error is present, one or more of the error syndromes will be high (i.e., corresponding one(s) of PARITY 430–438 find(s) odd parity) causing gate 444 to output a low signifying that an error is present. If an odd number of error syndromes (i.e., 1, 3, 5, 7, or 9) is high, PARITY 443 will sense not even parity and output a low to gate 445 signifying a single bit error. Note that all single bit errors will cause an odd number of highs. The double bit error signal will be generated by gate 445 if an even number of error syndromes (i.e., 2, 4, 6, or 8) is high and gate 444 supplies a low.

The nine bit error syndrome is decoded by 3 To 8 DECODE 450, 451, 452, 453, 454, 455, 456, 457, 458, and 459 to produce the 36 correction signals transferred via cable 420 to XOR's 422. As stated earlier a single bit error will cause the generation of a single corresponding error signal.

Figure 10:
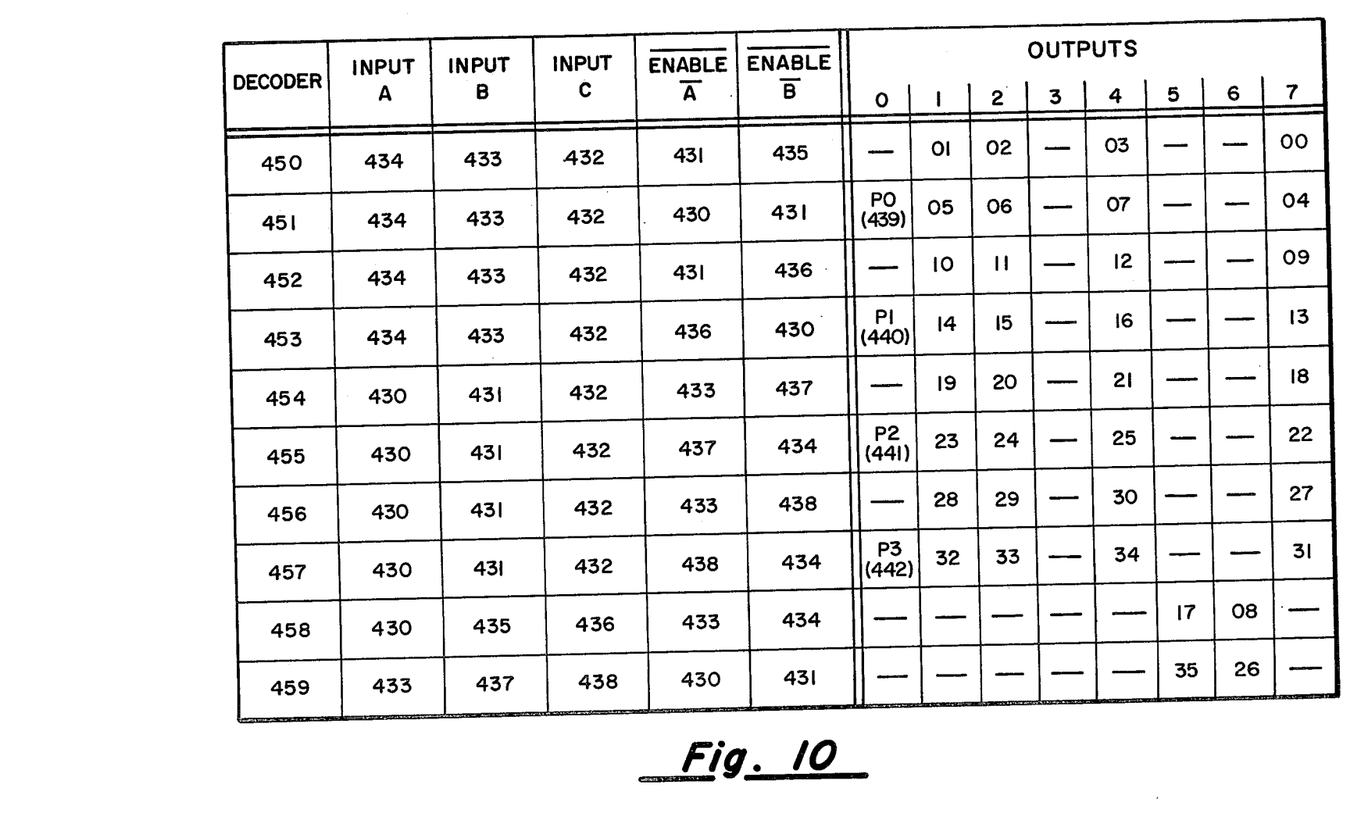
FIG. 10 shows the inputs and outputs to 3 To 8 DECODE 450, 451, 452, 453, 454, 455, 456, 457, 458, and 459.

FIG. 10 shows the three inputs and two enables (notice inversion) for each of 3 To 8 DECODE 450-459. For convenience, the reference to a one of PARITY 430-438 is given. The eight outputs of each of 3 To 8 DECODE 450-459 is also shown in FIG. 10. For convenience, the bit position of the correction signal is shown. Notice that the four through checking parity signals, P$\phi$, P1, P2, and P3 occur by action of exclusive-OR gates 439, 440, 441, and 442 respectively.

It can be seen that the present invention provides SEC/DED with through checking using a storage capacity of only 45 bits per addesssable location for a 36 bit data word. Those skilled in the art will readily be able to utilize the present invention in other related applications.

What is claimed is:

1. A memory system which provides single bit error correction/double bit error detection and through checking comprising:
   an input data register capable of temporarily storing and outputting a data quantity having n data bit positions and x through checking parity bits;
   a memory having a plurality of addressable locations input from said input data register wherein each of said plurality of addressable locations is capable of storing said data quantity and said x through checking parity bits and y coded check bits;
   means input by said input data register and outputting to said memory for generating said y coded check bits such that the combination of said y coded check bits and said x through checking parity bits is sufficient to enable correction of a single bit error in said data quantity and to enable detection of a double bit error in said data quantity, and such that $n > 2y$;
   an output data register capable of temporarily storing said data quantity and said x through checking parity bits; and
   means input by said memory and outputting to said output data register for performing single bit error correction upon said data quantity received from said memory before transfer to said output data register.

2. A memory system according to claim 1 further defined such that:

$n = 36$;

$x = 4$;

and $y = 5$.

3. A memory system according to claim 1 or 2 wherein said data quantity has a plurality of bytes and each of said x through checking parity bits is a parity bit for a different corresponding one of said plurality of bytes.

4. In a memory system receiving, storing, and outputting quantities consisting of both n data bits and x through checking parity bits, a method of single bit error correction on said stored quantities comprising:
   receiving as input said quantities consisting of both n data bits and x through checking parity bits and storing said through-checked quantity;
   generating in consideration of said n data bits an error correction code of y bits wheren $n > 2y$, meaning that y bits are of themselves insufficient in number of single bit error correction of said n data bits;
   storing said y bits of error correction code along with said through-checked quantity of n data bits and x through checking parity bits;
   retrieving said stored quantities of n data bits and x through checking parity bits and y error correction bits;
   generating z miscompare bits called syndromes based on said n data bits and said y error correction bits;
   utilizing said z syndrome bits and said x through checking parity bits to effect single error correction within said n data bits; and
   outputting said single error corrected in data bits and said x through checking parity bits.

5. The single bit error correction method of claim 4 adapted for single and double bit error detection and further comprising:
   utilizing said z syndrome bits to detect single bit errors and to detect double bit errors; and
   outputting said detection of single and double bit errors.

6. A method according to claim 4 wherein $n = 36$, $x = 4$, $y = 5$, and $z = 9$.

* * * * *

UNITED STATES PATENT AND TRADEMARK OFFICE
CERTIFICATE OF CORRECTION

PATENT NO. : 4,345,328
DATED : August 17, 1982
INVENTOR(S) : Gary D. White

It is certified that error appears in the above-identified patent and that said Letters Patent are hereby corrected as shown below:

Column 5, Line 40, "n > 2y" should be — $n > 2^y$ —.

Column 6, Line 24, "wheren n > 2y" should be — wherein $n > 2^y$ —.

Line 26, "of single" should be — for single —.

Signed and Sealed this

Seventh Day of December 1982

[SEAL]

Attest:

GERALD J. MOSSINGHOFF

Attesting Officer       Commissioner of Patents and Trademarks